United States Patent Office 2,789,083
Patented Apr. 16, 1957

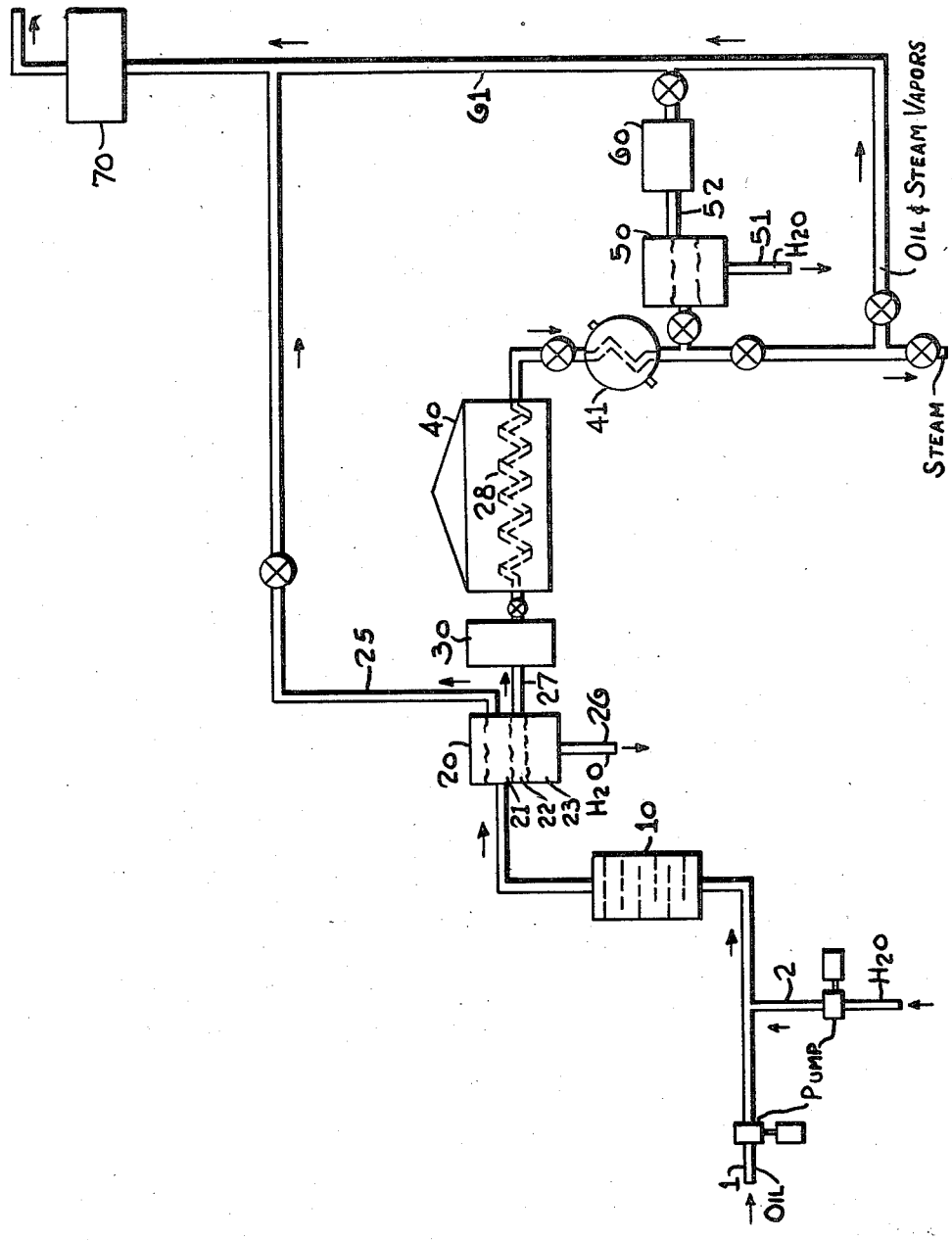

2,789,083

DEASHING OF HYDROCARBON OILS

Robert L. Hardy, Westfield, N. J., assignor to Esso Research and Engineering Company, a corporation of Delaware Application April 9, 1952, Serial No. 281,282

9 Claims. (Cl. 196—50)

This invention relates to the removal of ash constituents from hydrocarbon oils and particularly from gas oil or similar distillate oils prior to their use as feed stock for catalytic cracking operations. According to the present invention the oil is first washed with water to form three layers, namely, clear oil, an emulsion, and separated water. In this manner ash-forming constituents can be largely washed out of the oil and concentrated in the emulsion layer. After decanting of the clear oil layer, the ash constituents present in the emulsion phase can be precipitated or rendered insoluble by heating of the emulsion, whereupon the insoluble material may be filtered off. The resulting clear oil separated from the heated emulsion may then be recovered and used as additional cracking feed.

In catalytic cracking it has been known for some time that certain metals, in particular, iron, nickel and vanadium, are very harmful to cracking catalysts. When deposited on cracking catalyst, concentrations of about 0.1% or less of such metals cause the production of excessive amounts of coke and gas at the expense of valuable gasoline and heating oil fractions. This leads to an overloading of the regeneration and gas handling equipment and reduces the allowable feed rate to the catalytic cracking units.

There are two principal sources of metallic contamination in catalytic cracking units. The first is erosion of the unit itself. Unfilterable metallic impurities brought in with the feed stock, either in colloidal suspension or particularly as oil-soluble, metallo-organic compounds are the second source. Erosion iron may account for as much as 50% or so of the amount of iron on a plant equilibrium catalyst in fluid-type catalytic cracking. However, iron and other metal impurities brought in with the feed stock, though accounting for a lesser proportion of the total contaminant content, are much more detrimental in effect and probably responsible for 60 to 70% of the deterioration of the catalyst performance. Two types of contaminants are normally present in catalytic cracking feed stocks. The first include fine particles or oil-soluble metallo-organic compounds found in the original crude. These compounds, however, are effectively separated by distillation and occur to only a minor extent in such catalytic cracking feed stocks as the gas oil range distillates principally involved here. The second type of contaminants results from corrosion of metal lines and tankage by naphthenic and other type organic acids present in the feed stocks. It is the removal particularly of this latter type of contaminants with which the present invention is concerned.

Prior to this invention it has been proposed to remove ash-forming contaminants from oil by percolating the entire oil feed through a filter bed, as in U. S. Patent 2,384,315. This proved fairly successful for removing particles of undissolved impurities but was only moderately effective for removing contaminants dissolved in the oil. It has also been suggested to purify oil by washing it with water so as to form three phases, namely, a clear oil consisting of a major portion of the feed, an emulsion, and a water layer. This appears to concentrate oil soluble contaminants in the intermediate emulsion layer. But it has the disadvantage that long settling times are required after washing and that the washed out contaminants become redispersed in the secondary oil phase which is obtained upon breaking of the emulsion. This oil phase must, therefore, be further purified if intended for use as a catalytic cracking feed.

Heretofore, such further purification has been of questionable advantage in view of the involved procedures required or the incompleteness of obtainable oil recovery. One of the more promising proposals has been disclosed in copending application of Jahnig and Kaulakis, Serial No. 248,214, filed September 25, 1951. According to this, the emulsion layer or particularly the contaminated oil resulting from the breaking of the emulsion layer may be passed to a distillation column where a clean distillate suitable as cracking feed is obtained. However, even this method requires long settling times after the main washing step and is generally not so effective as might be desired, since at least a small amount of bottoms must be left behind and discarded after distillation of the secondary oil phase. Also, with the advent of increasingly high boiling feed stock, the heat requirements of such a distillation are rather high so that a very considerable portion of the oil from the emulsion layer must be discarded unless expensive two-stage vacuum distillation is employed.

It is the object of this invention to provide an improved method for deashing hydrocarbon oils with a minimum loss of feed. Another object is to provide a deashing process not requiring any distillation columns as part of its recovery system. These and other objects as well as the nature of the invention will become more clearly apparent from the subsequent description and the accompanying drawing whose single figure schematically illustrates a preferred embodiment of the invention.

According to this invention, an oil feed which may contain about 3 to 35 or usually 5 to 15 lbs. of iron and other ash-forming impurities per 1000 barrels may be washed by intimate mixing with about 5 to 30, preferably about 10 to 15 weight percent of water so that the resultant mixture separates into several layers, namely, a supernatant clear oil layer, an intermediate emulsion layer, and usually also an aqueous layer at the bottom. Depending on the time allowed for settling, the washed clear oil layer may typically consist of about 85 to 98, or say about 90 to 95 weight percent of the original oil feed but only a negligible amount of ash constituents, for instance, about 3 to 5 weight percent of the total iron originally present. The settling time allowed may range from about ½ to 24 hours or more. The formed emulsion layer is usually quite stable and may contain about 2 to 15 weight percent of the total original oil, and about 30 to 70 weight percent of the total iron originally present in the feed. Water may amount to about 30 to 70 weight percent of the emulsion layer. Finally, the aqueous layer usually contains water-soluble salts of iron and other metals dissolved in the rest of the water and may also contain a sediment of iron oxide and other insoluble impurities. The clear oil layer may then be decanted, as otherwise contaminants such as the oil-soluble iron compounds concentrated in the emulsion layer find their way back into the oil, if the emulsion layer is broken before its separation from the supernatant clear oil.

After decanting the emulsion layer, it is desirable to separate a major amount of the water from the emulsion. Settling tanks, chemical demulsifiers or electrical precipitators can be used for this purpose to produce an emulsion containing preferably less than about 10 weight percent of water.

Without necessarily restricting this invention thereto, it is believed that the presence of iron as iron naphthenate or similar metal soaps is the reason for the formation of the stable emulsion when oil feeds are washed with water. The metal soap may comprise only a minor proportion of the iron present. However, this may serve to stabilize the emulsion which entraps the suspended contaminants. This may then account for the high total concentration of metal contaminants in the emulsion layer.

It has been found that the metal soaps decompose readily on heating the emulsion to a suitable temperature, simultaneously also causing a destabilization or breaking of the emulsion and releasing insoluble impurities. As a result, after proper heating of the emulsion, the metallic impurities may be removed with surprising ease by simple filtration of the secondary oil layer formed upon breaking of the emulsion. This is illustrated by the following example.

EXAMPLE

An East Texas heavy gas oil containing about 1 pound per 1000 barrels of total ash was artificially contaminated further to a total ash content of 78.1 pounds per 1000 barrels by adding thereto 0.25 weight percent (on the gas oil) of an oil solution of iron naphthenate containing an equivalent of 6.1 weight percent of iron. The gas oil had an API gravity of 25.8 and a boiling range of about 650 to 1000° F. This oil was heated by passing through a heated coil at atmospheric pressure and at the various temperatures indicated in the table below, at a rate of about 52.3 v./v./hr., giving a total residence time of 69 seconds based on cold feed. The heated oil was then filtered through a Whatman No. 12 filter paper and the total ash as well as oil soluble ash of the filtered oil were determined. The data are summarized in Table I.

*Table I.*

| Heat treatment | Ash, lbs./1,000 bbls. | |
|---|---|---|
| | Total | Oil Soluble [2] |
| None | 78.1 | 60.4 |
| 300° F | [1] 68.0 | 60.4 |
| 600° F | [1] 61.7 | 36.5 |
| 900° F | [1] 47.8 | 2.5 |

[1] The decrease in total ash depending on temperature is due to the fact that more iron is deposited on the heating coil at higher temperatures.
[2] After paper filtration.

It will be noted from the tabulated data that heating at temperatures below about 400 or 500° F. has relatively little effect on the ash at the short heating times employed. However, at 600° F. the decrease in soluble ash is very noticeable, making about 40 percent of the original soluble ash removable by simple filtration. Heating the oil for 69 seconds at 900° F. renders the iron originally present in the form of soluble naphthenate almost completely removable by paper filtration.

When an oil-and-water emulsion is similarly heat-treated as contemplated by the present invention, the effect will be even more striking. The thermal decomposition of the soluble ash or metal soap will be helpful in both facilitating the breaking of the emulsion and in making insoluble ash particles more readily filtrable by depriving them of the dispersing agent.

The operation of the invention will be best understood from the subsequent more detailed description wherein reference is made to the attached drawing which illustrates a system suitable for carrying out a preferred embodiment of the invention.

The illustrated system essentially comprises a water-and-oil mixer 10, a phase settler 20, an electrical precipitator 30, an emulsion heater 40, secondary settler 50, a filter 60 and a catalytic cracking unit 70. The functions and coaction of these elements will now be explained, using as an example the treatment of a heavy gas oil containing about 10 pounds of iron-containing ash constituents. It should be understood, however, that the system may be employed in substantially analogous manner for the deashing of other cracking feed stocks or similar oils.

In operation the gas oil supplied through line 1 is mixed with about 10 weight percent of water added through line 2. Intimate mixing of the liquids is effected in mixer 10 which may be a series of orifice plates or a globe valve, or the like. The intimately mixed liquids in the form of an emulsion are then passed to settler 20 where the mixture gradually separates into a supernatant clear oil layer 21, a stable emulsion 22 and an aqueous layer 23. In a conventional settling tank a satisfactory separation may be reached after a residence time of about 1 to 50 hours, though more rapid separation may be obtained if a certrifuge, an electrical precipitator or ash-free chemical demulsifiers are used in addition to or instead of a simple settling tank. Suitable demulsifiers may include salts of quaternary bases such as cetyl pyridinium chloride or acetate, or the analogous dodecyl or benzyl compounds, or alkyl imide azaline hydrochlorides and the like.

The clear oil layer may amount to 85 to 98 volume percent of the oil fed. It is essentially free of water and insoluble metal contaminants and has only a negligible content of oil soluble metal compounds, e. g., 0.5 to 2 pounds per 1000 barrels. Accordingly, this clear oil may be separated from the separation vessel via overflow line 25 or by other convenient means, and passed directly to the cracking unit 70 where it may be conventionally cracked in contact with a siliceous cracking catalyst or the like.

The aqueous layer which may contain precipitated contaminants, as well as water soluble salts, may be withdrawn from the bottom of settler 20 via line 26 and usually discarded, or may be recovered.

The intermediate emulsion layer 22 which may contain about one-half of the iron and other ash-forming constituents present in the original oil feed is then separately withdrawn from settler 20 via line 27 and passed preferably through an electrical precipitator 30. In the precipitator 30 most of the water is precipitated out of the emulsion and is withdrawn through line 31, leaving an oily emulsion containing preferably not more than about 10 weight percent of water. However, where heat and capacity of coil 28 do not represent serious process limitations, no precipitator needs to be employed between settler 20 and coil 28. The oil or oily emulsion is heated to about 800 to 900° F. in heating coil 28 with a contact time of 1 to 1½ minutes at the temperature specified. Coil 28 may be heated by furnace 40 or other known heating means may be employed. For instance, when desired, the indicated high-temperature residence time may be obtained by using a soaker (not shown) in combination with heating coil 28. Excessive vaporization of the oil, as well as deposition of contaminants on the heating surface, is preferably prevented by maintaining an elevated pressure of about 100 to 500 pounds per square inch gauge on the hot emulsion, so that at least some of the oil is maintained in liquid phase.

The heated emulsion is then preferably passed through cooling coil 41 where it may be cooled to a temperature between about 100 and 200° F. whereupon it is passed to a second settler 50. In settler 50 the cooled emulsion readily separates into water and clear oil. The water and any contaminants precipitated therein may then be drawn off from the bottom of settler 50 via line 41 and discarded or further processed as may be desired.

Alternatively, and especially where the oil contains considerable amounts of water, all or most of the latter may be flashed off as steam at low pressures after passage of the stream through heater 40 and cooler 41. The remaining oil, water and contaminants may then be handled as just described. Or where, for instance, the oil is incompletely vaporized in heater 40, or where it is only partially condensed in cooler 41, only the liquid oil portion may be filtered free of contaminants while the uncondensed hot vapors of substantially pure oil may be passed directly to cracking unit 70.

Where a settler 50 is used as illustrated, the upper oil layer may be passed from the settler via line 52 to filter 60 wherein any iron particles formed by decomposition of the soluble soaps and those remaining suspended in the oil layer may be readily separated. The fitered oil may then be passed via line 61 and combined with the clear oil recovered in line 25 from the original water washing step. All these modifications provide nearly complete recovery of a purified catalytic cracking feed stock containing only a negligible amount of iron and other ash-forming contaminants.

The cracking unit 70 is preferably of the "Fluid" type which is particularly efficient for converting high boiling feed stock into gasoline, but which is also particularly sensitive with respect to catalyst contamination. The operation of such a cracking unit as such is well known in the art and described, for instance, in U. S. 2,472,723, and therefore need not be further described herein. However, the present invention also offers similar advantages in combination with cracking processes employing a granular catalyst in a fixed or moving bed or the like, in lieu of powdered catalyst in fluidized form. Catalysts suitable for use in any of these cracking processes are well known and may be acid treated natural clays, synthetic silica-alumina gels, synthetic silica-magnesia gels and the like.

In a typical operation of the illustrated system, as compared to an operation making no provision for removal of metal contaminants, the formation of carbon during catalytic hydrocarbon conversion may be reduced by as much as 20 percent under otherwise identical conditions, thus increasing unit capacity, and improving product distribution. At the same time cracked gas volume may be reduced by as much as 50 percent, reducing the load on compression and absorption equipment.

While the foregoing has been given by way of example, it will be understood that various variations and modifications may be made therein. For instance, in general the temperature and residence time of the emulsion in the heat soaking stage should be so correlated that maximum decomposition of contaminants takes place while cracking of hydrocarbons is kept at a minimum, and preferably low enough to avoid the formation of any gas and coke. Suitable conditions fall within the broad ranges of about 0.10–5 minutes residence time at temperatures of about 600°–900° F., residence times of about 0.25–5 minutes and temperatures of about 700°–850° F. being most suitable for conventional gas oil stocks. The soaking treatment may be carried out in a heating coil of suitable dimensions, or in a tube-and-tank type system wherein the oil is rapidly heated to the desired soaking temperature in a tube furnace and then discharged into a soaking drum where it is kept at the soaking temperature for the desired time.

The oil layer obtained after breaking of the heat-soaked emulsion may be filtered with the aid of conventional filtering means such as paper filters, precoat filters employing non-adsorptive filter aids, blotter presses employing paper filter media, filter beds of adsorbent materials such as various clays, beauxite, sand, charcoal, silica gel, activated alumina, spent silica-alumina or silica-magnesia cracking catalysts, and so on. The temperature of the filtration step is preferably between about 100 and 300° F. However, sometimes it may be advantageous from the point of view of heat conservation to operate the filtration step substantially at or only slightly below the heat-soaking temperature, without any intervening cooling step. Such high temperature filtration may be particularly advantageous when the oil is only incompletely vaporized in the heater. In such an instance the oil vapors from the heater as well as the liquid oil from the filter may be fed directly to the cracking unit. Considerable heat can be saved in this manner.

It will also be understood that while the invention has been described with particular reference to iron and iron compounds, which usually are the principal ash-forming contaminants in catalytic cracking feed stocks, the invention is similarly applicable to other metal contaminants such as vanadium, chromium, nickel, zinc, copper, etc. Also, while metal naphthenates are representative of a common type of soluble metal compounds, the metal contaminants may similarly exist as salts of other organic acids, such as $C_{16}$ to $C_{20}$ fatty acids, phenols and other known materials.

The foregoing general description and embodiments have served to illustrate the nature of the invention. However, the scope of the invention is not intended to be limited thereto, except as specified in the appended claims.

I claim:

1. A method for treating hydrocarbon oil containing unfilterable metallic contaminants, which comprises intimately mixing the hydrocarbon oil with a minor amount of water in liquid phase, settling the resulting mixture to form a clear oil layer, a water phase and an aqueous emulsion layer, separating the oil layer, the water phase and the emulsion layer, then heating the separated emulsion layer at a temperature above about 500° F. to make the metallic contaminants filtrable, breaking the emulsion separating water from the resulting liquid oil phase, and filtering the oil phase to remove the metallic contaminants.

2. A method according to claim 1 wherein the contaminants contain metal salts of organic acids.

3. A method according to claim 2 wherein the hydrocarbon oil is a distillate gas oil.

4. In a method for converting distillate gas oil feed containing soluble contaminants in the form of a metal soap of an organic acid, the improvement which comprises intimately mixing 100 parts by weight of the gas oil feed with about 5 to 30 parts by weight of water in liquid phase, settling the mixed liquids to form a major layer of clear oil relatively free of contaminants and containing about 85 to 98 weight percent of the original feed oil, a stable emulsion layer containing the rest of the oil emulsified in water and containing a substantial proportion of the original metal soap, and a water layer, separating the said major layer of clear oil from the emulsion layer, heating the separated emulsion layer at a temperature between about 750 and 1000° F. for a period between about ¼ and 10 minutes at a pressure at least sufficient to maintain some oil in liquid phase, cooling the heated emulsion mixture to a temperature between about 100 and 200° F., settling the cooled mixture to separate it into a water phase and an oil phase containing dispersed contaminants, withdrawing the separated oil phase and passing it through a filtration zone to free the oil of the dispersed contaminants.

5. In a method for treating distillate gas oil which contains oil-soluble metal organic contaminants, the improvement which comprises intimately mixing 100 parts by weight of the gas oil with about 5 to 30 parts by weight of water, settling the mixed liquids to form a substantially ash-free oil layer and a water-and-oil emulsion containing the contaminants, removing the emulsion layer and passing it through a precipitation zone where it is separated into a water layer and an oil layer containing only a small amount of water, heating the last-mentioned oil layer to a temperature between about 700 and 900° F. under pressure to decompose the oil-soluble contaminants while maintaining at least a portion of the oil in liquid phase, flashing off steam therefrom at relatively low pressure, and filtering the remaining liquid oil layer to separate the contaminants therefrom.

6. A method according to claim 5 wherein oil vapors and steam are flashed off from the heated oil layer and passed to a catalytic cracking zone.

7. A method according to claim 4 wherein the contaminants include iron.

8. A method according to claim 4 wherein the said major layer of clear oil and the said filtered oil phase are passed to a catalytic cracking step.

9. A method according to claim 5, wherein the said heating of the oil layer is done under pressure of about 100 to 500 lbs. per square inch and wherein the heated oil layer is cooled before flashing off the steam.

References Cited in the file of this patent

UNITED STATES PATENTS

| | | |
|---|---|---|
| 1,202,969 | Cornell | Oct. 31, 1916 |
| 2,187,741 | Houdry | Jan. 23, 1940 |
| 2,416,608 | Brackenbury | Feb. 25, 1947 |
| 2,421,968 | Schutte | June 10, 1947 |
| 2,682,496 | Richardson et al. | June 29, 1954 |

OTHER REFERENCES

"Aging of Cracking Catalysts," Mills Ind. and Eng. Chem., vol. 42, January 1950, pages 182–187.